May 3, 1960 N. D. POTTER 2,935,102
PORTABLE ELECTRIC SHAPING TOOL
Filed Dec. 17, 1958 4 Sheets-Sheet 2

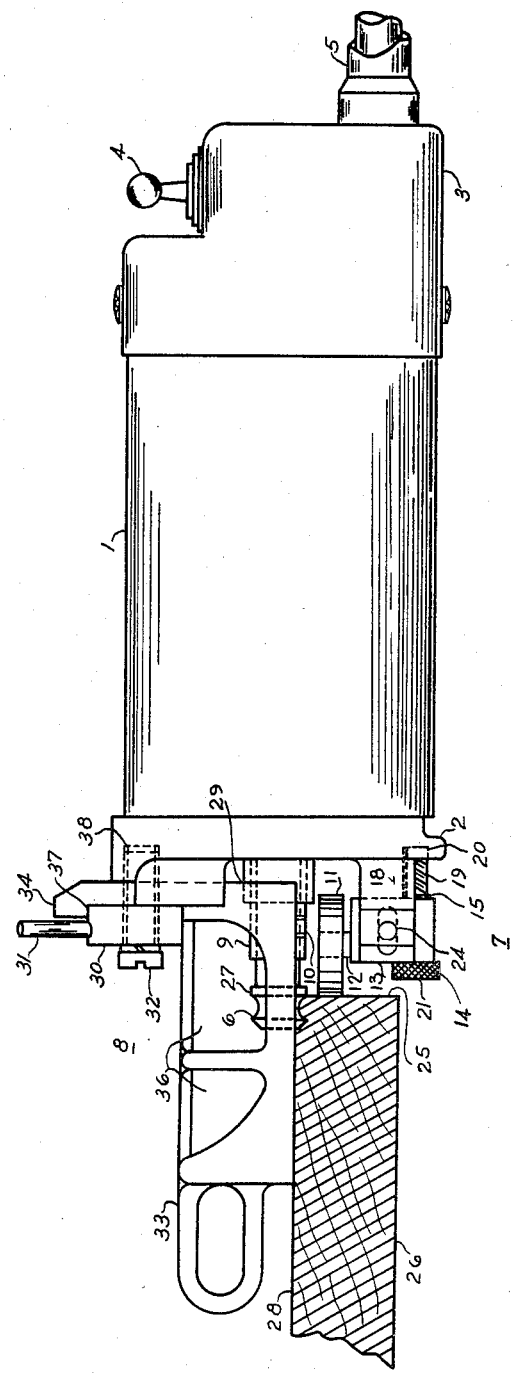

INVENTOR.
NATHANIEL D. POTTER
BY
*Leonard Bloom*
ATTORNEY

May 3, 1960

N. D. POTTER 2,935,102

PORTABLE ELECTRIC SHAPING TOOL

Filed Dec. 17, 1958

INVENTOR
NATHANIEL D. POTTER
BY
Leonard Bloom
ATTORNEY

May 3, 1960   N. D. POTTER   2,935,102
PORTABLE ELECTRIC SHAPING TOOL
Filed Dec. 17, 1958   4 Sheets-Sheet 4
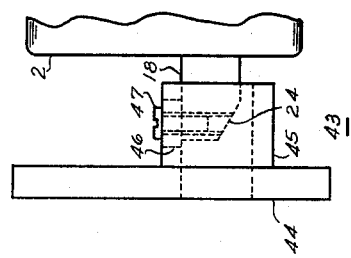
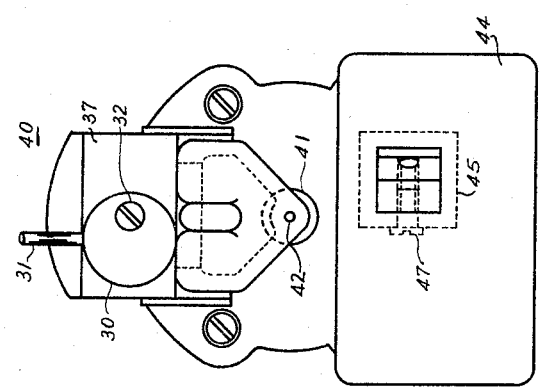
INVENTOR.
NATHANIEL D. POTTER
BY
ATTORNEY

United States Patent Office 2,935,102
Patented May 3, 1960

2,935,102

PORTABLE ELECTRIC SHAPING TOOL

Nathaniel D. Potter, Baltimore, Md., assignor to The Black and Decker Manufacturing Company, Towson, Md., a corporation of Maryland Application December 17, 1958, Serial No. 780,975

10 Claims. (Cl. 144—134)

The present invention relates to a portable electrically-powered shaping tool, and more particularly, to such a tool that will perform a variety of woodworking operations, such as beading, inlaying, grooving and molding, as well as certain other operations such as veneer trimming and the like.

In the prior art, of which I am aware, many beading, inlaying, and other decorative finishing operations on articles of wooden furniture and the like have either been performed by hand or else by means of clumsy, power-driven mechanical tools. Decorative finishing by means of hand methods, especially in beautiful and intricate arrays, necessarily requires unusual craftsmanship and patience; and the time and skill consumed thereby so increase the manufacturing costs as to preclude such decorative finishing in ordinary mass-produced furniture and confine its use to the limited area of very expensive and fine furniture. Certain decorative finishing operations, however, have to a degree been mechanized by means of power-driven tools, where technically and economically feasible to do so; and such mechanical methods fall into two general categories; one, either the power-driven tool is stationary and the work is moved with respect to the tool, or secondly, the work is held stationary and the power tool is of the portable type and is moved with respect to the work. The first such mechanized method is difficult to control, requires experienced personnel, and is incapable of rapid, precision finishing. The second such method is presently accomplished by portable tools that are heavy, complicated, clumsy and bulky, inaccurate, difficult to manipulate, and so arranged as to obscure the immediate working area from the vision of the operator. Moreover, both methods do not allow for close, fast, high-quality work in the cramped and tight working areas found invariably in almost all types of furniture. It would be highly desirable, therefore, to provide a light-weight, portable tool that could rapidly and accurately perform a variety of decorative finishing operations and the like.

Accordingly, it is an object of the present invention to provide a relatively inexpensive, portable, power-driven tool that is rugged, reliable, simple to adjust and operate, and capable of rapid and precision decorative finishing.

It is another object of the present invention to provide such a tool that can perform a variety of wood working operations, such as shaping, beading, inlaying, grooving, molding, and the like, equally as well in either a free or in a cramped working area.

It is yet another object of the present invention to provide such a tool that by means of simple attachments can perform certain other desired operations, such as veneer trimming and the like.

It is a still further object of the present invention to provide a small, light-weight, portable tool that is held generally horizontally (but which may be held vertically) with the operator using only one hand while his other hand is free to hold or position the work piece.

In accordance with the teachings of the present invention, a portable electric shaping tool is provided with a lightweight electric motor having a shaft associated therewith and being housed in a suitable casing. A desired cutting bit may be directly coupled to the motor shaft; thereafter, the axial and transverse position of the cutting bit with respect to the motor or motor casing is maintained stationary, and the desired position of the cutting bit with respect to the workpiece is adjusted by means of a pair of separate guide mechanisms. Each guide mechanism is secured directly to the motor casing, and the operation and adjustment thereof is independent and separate both of each other and of the cutting bit. One such guide mechanism has a portion thereof that rests upon and slides along the working surface as the entire tool engages the work piece, and an internal adjustment means is provided therein in order to regulate the vertical depth of the cut. The other such guide mechanism operates substantially at right angles to the first guide mechanism and is adapted with a portion thereof that rests against and slides along the surface of the work piece that is substantially perpendicular to the working surface. Likewise, an internal adjustment means is provided in this latter guide mechanism so as to regulate the horizontal distance along the working surface from the edge thereof to the cut.

Other objects of the present invention will become apparent from the following specification taken in conjunction with the enclosed drawings, in which:

Figure 1 is a side view of the complete portable electric shaping tool showing in outline form the driving portion thereof and showing in detail the upper and lower adjusting guide mechanisms and the manner in which the cutting bit engages the surface of the work piece;

Figure 8 is an end view thereof, and

Figure 9 is a top view of the lower adjustable guide mechanism in the mounted position.

Figure 3:
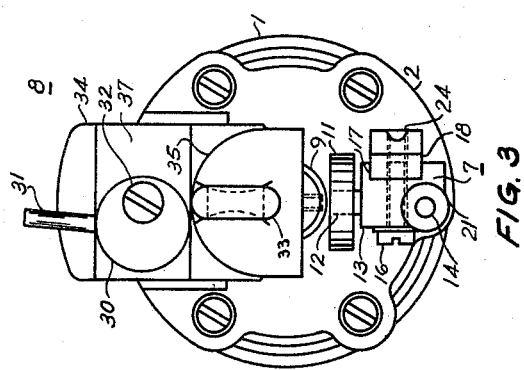
Figure 3 is a partial end view of the complete tool.

With reference to Figure 1, the electric motor's field casing 1, the fan cover 2 and cap 3 secured thereto, switch 4, and electric line 5 are shown in outline form, while the cutting bit 6, lower adjustable guide mechanism 7, and upper adjustable guide mechanism 8 are shown in detail. The complete portable electric shaping tool may be held with only one hand in a variety of convenient positions, but for simplicity of illustration the tool is shown in the horizontal position. The particular cutting bit 6 as shown in the drawings will perform a simple beading operation, but it is to be understood that the essence of the present invention is independent of the particular example employed and is equally applicable to a wide variety of finishing operations. Cutting bit 6 is slidably adjustable within the cutting bit bearing 9 and is firmly secured therein by means of a suitable set screw 10. Thereafter, cutting bit 6 need not be adjusted, but rather is held stationary with the lower and upper adjustable guide mechanisms, 7 and 8 respectively, being adjusted as desired.

Figure 4:
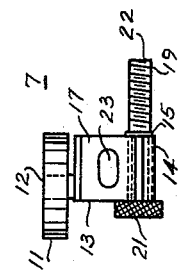
Figure 4 is a side view of the lower adjusting guide mechanism disengaged from the casing mounting stud.

With reference to Figures 1, 3, and 4, lower adjustable guide mechanism 7 comprises substantially a roller bearing 11, bearing shaft 12, guide block 13, adjustable mounting bolt 14, collar 15, and screw 16. Guide block 13 thereof is provided with a suitable groove or insert 17 so as to engage and slide over the mounting stud 18 that projects from fan cover 2. As guide block 13 engages mounting stud 18, the threads 19 of the adjustable mounting bolt 14 will engage a tapped recess or hole 20 provided in fan cover 2, whereby a movement of the knurled head 21 of adjustable mounting bolt 14 will cause the entire lower adjustable guide mechanism to slide with respect to mounting stud 18. Adjustable mounting bolt 14 has external threads 19, but is not threaded internally; and a suitable collar 15 is rigidly secured to the shank 22 to preclude the adjustable mounting bolt 14 from moving laterally with respect to guide block 13. When the desired adjustment has been reached, the entire lower adjustable guide mechanism 7 is locked with respect to mounting stud 18 by means of a suitable screw 16 that passes transversely through the slot 23 of guide block 13 and engages the threaded hole 24 of mounting stud 18, as shown in Figure 3.

Lower adjustable guide mechanism 7 is adjusted so that ball bearing 11 will rest tangentially on the vertical surface 25 of work piece 26; and for best results, the adjustment should be made so that the vertical surface 25 of work piece 26 will be coincident with flush point 27 of cutting bit 6 as is illustrated in Figure 1. Roller bearing 11 of lower adjustable guide mechanism 7 will revolve about bearing shaft 12 and will slide with respect to vertical surface 25 with hardly any friction involved as the entire tool is moved laterally along the work piece 26.

Whereas lower adjustable guide mechanism 7 is adapted to slide along the vertical surface 25 that is substantially perpendicular to the work surface 28, upper adjustable guide mechanism 8 is adapted to rest flush on the work surface 28 and to slide with respect to it, as the entire tool operatively engages work piece 26.

Figure 2:
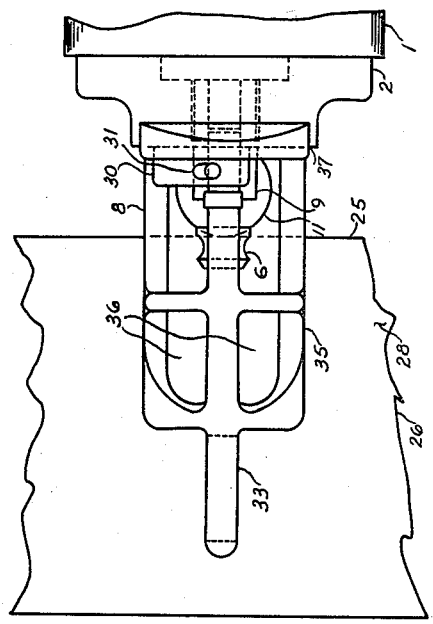
Figure 2 is a partial top view of the work engaging mechanism with the lower adjusting guide mechanism omitted for sake of clarity.

With reference to Figures 1, 2, and 3, upper adjustable guide mechanism 8 comprises substantially a main L-shaped guide block 29, cam 30, cam adjustment lever 31, and screw 32. The L-shaped guide block 29 is all one piece, and it has a lower portion 33 and an upper portion 34 thereof set at substantially right angles to each other. Lower portion 33, of L-shaped guide block 29, is substantially curved so as to be positioned over and around cutting bit 6, as shown in Figure 3; and the upper periphery 35 of lower portion 33 has a plurality of cut-away portions 36 so that the cutting bit 6 and the immediate working area of work piece 26 are not obscured from the vision of the operator but rather are open to inspection and observation at all times.

The upper portion 34 of L-shaped guide block 29 is provided with a suitable insert or groove 37 which is adapted to house cam 30 as is shown more clearly in Figure 3. The entire upper adjustable guide mechanism 8 is secured to fan cover 2 by means of a suitable screw 32 that passes loosely through cam 30 and engages a threaded hole 38 in fan cover 2. In order to adjust the upper adjustable guide mechanism 8, screw 32 is loosened a trifle and cam adjustment lever 31 is moved slightly along a plane parallel to groove 37. Cam 30 is mounted in groove 37, and is pivotally secured therein by means of screw 32, having an axis eccentric to the center of cam 30. Cam adjustment lever 31 and cam 30 are rigidly secured together (or else integrally fashioned), and as cam adjustment lever 31 is moved back and forth slightly, cam 30 will pivot on screw 32 and move laterally with respect to groove 37, thereby causing the entire upper adjustable guide mechanism 8 to move in a plane perpendicular to work surface 28 of work piece 26.

Figure 5:
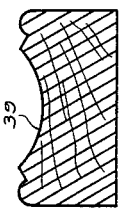
Figure 5 is a cross-sectional view of one example of the intricate and attractive effects that may be accomplished by proper use of the present invention.

It is seen that the present invention fulfills a critical need for a lightweight, easily-adjustable, portable, electric shaping tool that can perform a variety of pleasing and fashionable decorative-finishing operations quickly, easily, and accurately, in cramped and hard-to-reach places. Moreover, the particular cutting bit 6 illustrated in Figures 1 and 2 is merely indicative of the type of finishing operations involved, and it is not to be construed that the scope of the present invention is to be limited thereby. Indeed, the present invention is equally applicable to a wide variety of ornamental effects, one example of which is shown in Figure 5. The work piece illustrated therein in cross-sectional view has a shallow groove 39 (that has been made by a special grooving bit) combined with two beads at either end (made separately by means of the cutting bit illustrated in Figure 1) in order to produce an unusual and attractive effect.

Figure 7:
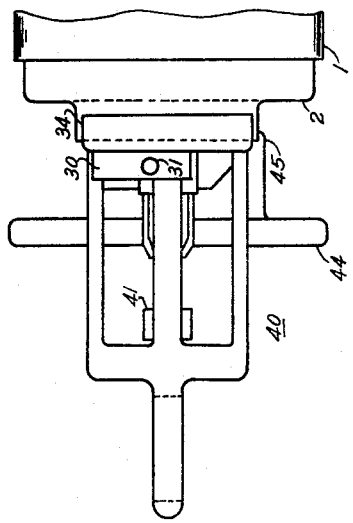
Figure 7 is a top view thereof.
Figure 6:
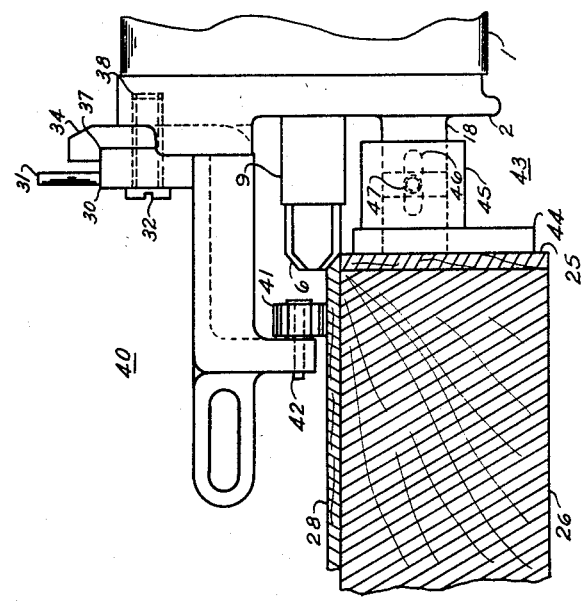
Figure 6 is a side view illustrating the adaption of the complete tool for a veneer trimming operation.

Moreover, a variety of other operations may be performed by the present invention; and Figures 6, 7 and 8 illustrate an adaptation of the present invention for a veneer trimming operation, wherein the excess material of a laminated plastic veneer is trimmed away. A suitable cutting bit 6 is employed, and is positioned with regard to the work piece 26 as shown in Figure 6. The upper adjustable guide mechanism 40 has an identical adjustment provided by cam 30, cam adjustment lever 31, groove 37, and screw 32; and in addition, as shown in Figure 6 and 7, upper adjustable guide mechanism 40 is provided with a bearing 41 (mounted on a shaft 42) that slides tangentially along work surface 28 as the entire tool is moved along work piece 26.

On the other hand, as shown in Figures 6 and 8 and more clearly in Figure 9, lower adjustable guide mechanism 43 has a flat plate 44 that lies flush against vertical surface 25 of work piece 26 and slides along it during the trimming operation. A hollow rectangular collar 45 is integrally-fashioned (or otherwise suitably secured) to the opposite surface of flat plate 44 and projects rearwardly therefrom so as to encompass and slide over mounting stud 18 projecting from fan cover 2. Rearwardly-projecting hollow collar 45 has a suitable slot 46 through which screw 47 passes to engage and lock with respect to the threaded recess 24 in mounting stud 18, once the lower adjustable guide mechanism 43 has been slided (manually) along mounting stud 18 to the desired position.

It is to be understood that the essence of the present invention is independent of the particular internal configuration of upper and lower guide mechanisms and the inherent adjusting means employed therein, and that the particular mechanisms illustrated in the drawings and described in the specification are merely exemplary of a variety of such guide mechanisms that could be used; consequently, the scope of the present invention is not to be limited thereby. Moreover, other modifications and slight improvements could be effected without departing from the basic spirit of the invention, and hence, it is to be understood that within the scope of the appended claims the invention could be practiced other than as specifically described.

I claim:

1. In a portable power-driven shaping tool of the type described; an adjustable guide mechanism adapted to raise or lower the axis of said tool, and the cutting bit thereof, vertically with respect to the working surface of the work piece; comprising; in combination; an L-shaped guide block having a horizontal and a vertical member thereof set at right angles to each other; said horizontal member thereof having a curved surface that extends over and above said cutting bit parallel to the longitudinal axis of said cutting bit; said curved surface of said horizontal member terminating in a pair of longitudinal edges that lie flush upon said working surface as said cutting bit operatively engages said work piece; said curved surface of said horizontal member of said L-shaped guide block having a portion cut away so that said cutting bit and said working surface will not be obscured from the vision of the operator; said vertical member of said L-shaped guide block having a slot therein extending transversely to the longitudinal axis of said cutting bit; a cam positioned within said slot and adapted to lie tangentially to the upper and lower edges of said slot; a cam adjustment lever rigidly secured to said cam and disposed externally to said slot; a screw passing through said cam and said vertical member of said L-shaped guide block and adapted to operatively engage a threaded recess within the casing of said tool; said screw having a center eccentric to the center of the cam; whereby said screw may be turned slightly to loosely disengage said entire adjustable guide mechanism from said tool casing, and said cam adjustment lever then may be manipulated to cause said cam to rock within said slot of said vertical portion of said guide block and thereby cause said entire first guide mechanism to move vertically with respect to said cutting bit, said screw being tightened thereafter once the desired depth adjustment has been reached to lock said entire first guide mechanism to said casing and thus preclude an inadvertent adjustment during the operation of the tool.

2. In a portable power-driven shaping tool of the type described; an adjustable guide mechanism adapted to adjust said tool, and the cutting bit thereof, laterally along the axis thereof with respect to the working surface of the workpiece; comprising; in combination; a mounting stud rigidly secured to the casing of said tool and extending forwardly therefrom along a longitudinal axis parallel to the axis of said cutting bit; a guide block adapted to slide laterally onto said mounting stud; a shaft extending from said guide block along an axis perpendicular to the longitudinal axis of said cutting bit; a bearing rotatably mounted upon said shaft; said bearing being adapted to slide tangentially along the surface of the work piece that is substantially perpendicular to the work surface thereof; an adjustable mounting bolt passing longitudinally through said guide block, and having external threads that operatively engage a threaded recess within said casing of said tool; means to preclude a relative longitudinal movement between said adjustable mounting bolt and said guide block; and a screw passing transversely through a slot in said guide block and having threads that operatively engage an internally-threaded transverse recess within said mounting stud; whereby said guide block may be locked with respect to said mounting stud by means of said screw when said adjustable mounting bolt has been suitably adjusted with respect to said casing of said tool, thereby precluding an inadvertent adjustment of the guide mechanism during the operation of the tool.

3. In a portable power-driven shaping tool of the type described; an adjustable guide mechanism adapted to raise or lower the axis of said tool, and the cutting bit thereof, vertically with respect to the working surface of the work piece; comprising; in combination; an L-shaped guide block having a horizontal and a vertical member thereof set at right angles to each other; said horizontal member thereof having an upper curved surface that extends over and above said cutting bit parallel to the longitudinal axis of said cutting bit; said horizontal member thereof having a lower projecting lip; a shaft projecting through said lip along an axis parallel to the axis of said cutting bit; a bearing rotatably mounted on said shaft; said bearing being forwardly-disposed from the tip of said cutting bit and being adapted to slide tangentially along said working surface of said work piece as said tool operatively engages said work piece; said curved surface of said horizontal member of said L-shaped guide block having a portion cut away so that said cutting bit will not be obscured from the vision of the operator; said vertical member of said L-shaped guide block having a slot therein extending transversely to the longitudinal axis of said cutting bit; a cam positioned within said slot and adapted to lie tangentially to the upper and lower edges of said slot; a cam adjustment lever rigidly secured to said cam and disposed externally to said slot; a screw passing through said cam and said vertical member of said L-shaped guide block and adapted to operatively engage a threaded recess within the casing of said tool; said screw having a center eccentric to the center of said cam; whereby said screw may be turned slightly to loosely disengage said entire adjustable guide mechanism from said tool casing, and said cam adjustment lever then may be manipulated to cause said cam to rock within slot of said vertical portion of said guide block and thereby cause said entire first guide mechanism to move vertically with respect to said cutting bit, said screw being tightened thereafter once the desired depth adjustment has been reached to lock said entire first guide mechanism to said casing and thus preclude an inadvertent adjustment during the operation of the tool.

4. In a portable power-driven shaping tool of the type described; an adjustable guide mechanism adapted to adjust said tool, and the cutting bit thereof, laterally along the axis thereof with respect to the working surface of the work piece; comprising; a mounting stud rigidly secured to the casing of said tool and extending forwardly therefrom along a longitudinal axis parallel to the axis of said cutting bit; a guide block consisting of a forwardly-disposed flat plate positioned so that one of its flat surfaces will lie flush against the vertical surface of the work piece and will slide with respect to said vertical surface as said shaping tool operatively engages said work piece, and a hollow collar secured to the opposite surface of said flat plate and projecting rearwardly therefrom so as to encompass and slide over said mounting stud; whereby said guide block may be moved laterally with respect to said mounting stud along an axis parallel to the axis of said cutting bit; and a screw passing transversely through a slot in said guide block and having threads that operatively engage an internally threaded transverse recess within said mounting stud; whereby said guide block may be locked with respect to said mounting stud by means of said screw when said guide block has been suitably adjusted with respect to said mounting stud thereby precluding an inadvertent adjustment of the guide mechanism during the operation of the tool.

5. A portable power-driven shaping tool of the type described, capable of performing a variety of shaping operations and adapted to be held in a variety of convenient positions and in particular in the horizontal position, with the main body of said tool being held away from the work so that the immediate working area is readily visible to the operator at all times, comprising, in combination, a motor having a spindle associated therewith, means for energizing said motor for rotating said spindle, a housing enclosing said motor and terminating in a substantially flat, base-like forwardmost portion thereof, said forwardmost portion of said housing being held away from said work and being in a plane that is perpendicular to the working surface, a cutting bit coupled to said spindle for rotation therewith and protruding beyond said forwardmost portion of said housing to engage said working surface, a pair of physically-separate independently-acting work-engaging adjustable guide mechanisms adapted to provide, respectively, an adjustment in the depth and position of the cut made on said working surface, and also adapted to provide, respectively, a pair of right-angularly disposed bearing means for properly guiding said tool and said cutting bit with respect to said work, comprising, a first adjustable guide mechanism secured to said forwardmost portion of said housing and extending forwardly therefrom adjacent said cutting bit and having a work-engaging portion thereof adapted to engage and slide upon said working surface, means included within said first adjustable guide mechanism to move said work-engaging portion thereof transversely with respect to said cutting bit, so as to vary the distance between said cutting bit and said working surface whereby the depth of the cut may be regulated, and a second adjustable guide mechanism physically separate and independently-acting from said first adjustable guide mechanism, secured to said forwardmost portion of said housing and disposed adjacent said cutting bit on the opposite side of said cutting bit from said first adjustable guide mechanism, said second adjustable guide mechanism extending forwardly from said forwardmost portion of said housing and having a forwardmost work-engaging portion thereof adapted to engage and slide along the surface of said work that is perpendicularly-disposed to said working surface, and means included within said second adjustable guide mechanism to move said work-engaging portion thereof laterally and parallel to the axis of said cutting bit, whereby the position of the cut may be regulated.

6. A portable power-driven shaping tool of the type described in claim 5, wherein said first adjustable guide mechanism comprises, a guide block having a pair of members set at right angles to each other, one of said members having said work-engaging portion thereof adapted to engage and slide upon said working surface, and the other of said members being secured to said forwardmost portion of said housing and having said means included therein to move said work-engaging portion transversely with respect to said cutting bit so as to vary the distance between said cutting and said working surface and having further means included in said other member to lock said first adjustable guide mechanism in its desired position so as to preclude an inadvertent adjustment during the operation of said tool.

7. A portable power-driven shaping tool of the type described in claim 6, wherein said work-engaging portion of said one member comprises a curved surface lying over and around said cutting bit and terminating in a pair of flat parallel edges adjacent to said cutting bit on either side thereof and adapted to slide along said working surface during the operation of the tool.

8. A portable power-driven shaping tool of the type described in claim 6, wherein said work-engaging portion of said one member comprises a depending, work-engaging bearing wheel mounted on a shaft, said shaft having an axis parallel to said cutting bit, and being mounted in a lower-projecting lip of said one member, said bearing wheel being adapted to roll tangentially along said working surface during the operation of said tool.

9. A portable power-driven shaping tool of the type described in claim 6, wherein said second adjustable guide mechanism comprises, a work-engaging roller bearing mounted on a shaft having an axis that is perpendicularly-disposed to said working surface, said roller bearing being adapted to roll tangentially along the surface of said work piece that is perpendicularly-disposed to said working surface, means to move said roller bearing laterally with respect to said cutting bit, and means to lock said roller bearing in its desired position so as to preclude an inadvertent adjustment during the operation of said tool.

10. A portable power-driven shaping tool of the type described in claim 8, wherein said second adjustable guide mechanism comprises, a mounting stud secured to said forwardmost portion of said housing and projecting forwardly therefrom along a longitudinal axis parallel to the axis of said cutting bit, a guide block slidably mounted upon said stud and having a forwardmost work-engaging flat plate adapted to slide along the surface of said work that is perpendicularly-disposed to said working surface, and means to lock said guide block in its desired position upon said mounting stud so as to preclude an inadvertent adjustment during the operation of said tool.

References Cited in the file of this patent

UNITED STATES PATENTS

| 1,506,154 | Berthelsen et al. | Aug. 26, 1924 |
| 1,701,947 | Crowe | Feb. 12, 1929 |
| 1,885,087 | De Witt | Oct. 25, 1932 |
| 2,672,898 | Schuster | Mar. 23, 1954 |
| 2,705,513 | Moeller | Apr. 5, 1955 |
| 2,839,107 | Emmons | June 17, 1958 |
| 2,878,842 | Pickersgill | Mar. 24, 1959 |

FOREIGN PATENTS

| 929,928 | Germany | July 7, 1955 |